No. 628,835. Patented July 11, 1899.
J. S. McDONALD.
ROD PACKING.
(Application filed Mar. 6, 1899.)
(No Model.)

Witnesses,
Robert Everett,
W. B. Teegh

Inventor:
John S. McDonald,
By James L. Norris,
Atty.

THE NORRIS PETERS CO., PHOTO-LITHO., WASHINGTON, D. C.

UNITED STATES PATENT OFFICE.

JOHN SHEPHERD McDONALD, OF NEW ORLEANS, LOUISIANA.

ROD-PACKING.

SPECIFICATION forming part of Letters Patent No. 628,835, dated July 11, 1899.

Application filed March 6, 1899. Serial No. 707,994. (No model.)

*To all whom it may concern:*

Be it known that I, JOHN SHEPHERD MC-DONALD, a citizen of the United States, residing at New Orleans, in the parish of Orleans and State of Louisiana, have invented new and useful Improvements in Rod-Packing, of which the following is a specification.

In United States Patent No. 292,026, issued to me January 15, 1884, I have shown and described certain improvements in hydraulic-pressure regulators, wherein is employed a pressure-cylinder, an accumulator, pipe connections between the cylinder and accumulator, a piston in the accumulator, and means for regulating the weight on said piston, and thereby controlling the hydraulic pressure in said cylinder. In devices of this kind where high pressures are required it is extremely important that means be provided for preventing the leakage between the piston-rod and the cylinder-head of the accumulator. The means heretofore employed by me and which has also been used by others consists of forming an internally-threaded cylindrical extension on the accumulator-head, locating brass rings with interposed leather packing-rings therein and tightly compressing and holding the latter in place by means of an externally-threaded nut, which engages the internal threads on said cylindrical extension. Ordinarily a metallic washer is employed between the upper packing-ring and the securing-nut; but even with this the turning of the nut for the purpose of tightening the packing-rings twists and thereby destroys to a certain extent said leather packing-rings, and as a great deal of force must be applied to the securing-nut it often happens that the screw-threads on said nut or cylindrical extension are stripped off and the device thereby rendered inoperative.

The object of my present invention is to avoid the difficulties heretofore met with; and the same consists of a rod-packing comprising a plurality of metallic rings, one above the other, having their upper and lower surfaces corrugated and having internal annular recesses merging into the central orifices therein, a seat for said rings, rings of leather or other like material interposed one between each pair of said rings, a gland having a corrugated lower end engaging one of said leather rings opposite said seat, and means for imparting a direct longitudinal movement to said gland.

Figure 1:
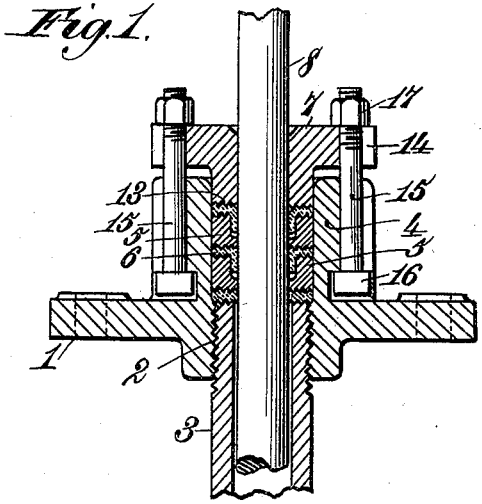
Figure 2:
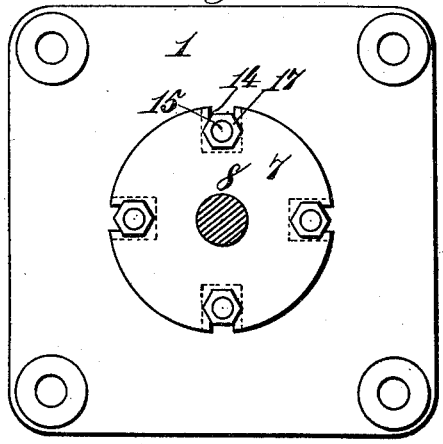
Figure 3:
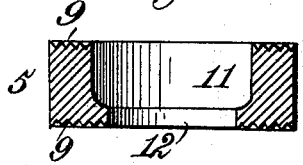

In the drawings, Figure 1 is a vertical sectional view through the head of a cylinder or accumulator, showing the parts coöperating therewith, including the piston-rod and the packing therefor. Fig. 2 is a top plan view of the same. Fig. 3 is a sectional detail.

Like reference-numerals indicate like parts in the different views.

The cylinder-head 1 is provided with a central internally-threaded opening 2, into which is screwed the accumulator-pipe 3, as clearly shown. Projecting above the body of the head 1 is a cylindrical extension 4, having a smooth bore in which the packing fits, the latter resting upon the upper end of the accumulator-pipe 3. The said packing consists of a plurality of metallic rings 5 and interposed rings 6, of leather or other like material, the rings 6 being held in place by the rings 5 and a gland 7, through which and the pipe 3 the piston-rod 8 passes. One of the metallic rings 5 is illustrated in detail in Fig. 3 of the drawings and, as shown, is provided upon its upper and lower sides with grooves or corrugations 9, which serve as engaging means for holding the leather rings 6 in place. Between the upper end of the pipe 3 and the lower ring 5 a washer of leather or other suitable material may be placed to prevent leakage at that point. The said rings 5 are further provided with internal annular recesses 11, which merge into central orifices 12 therethrough and serve as pockets in which the projecting edges of the leather packing rings 6 may fit. As heretofore stated, the packing composed of the rings 5 and 6 is compressed and held in place by the gland 7, whose lower edge is roughened or corrugated, as shown at 13, similar to the adjacent surfaces of the rings 5 and for a similar purpose. The head of said gland projects outwardly over the upper end of the cylindrical extension 4 and is provided with open slots 14 14 for the reception of the free ends of bolts 15, which are provided with heads 16, fitting in sockets in the extension 4. The upper ends of the threaded bolts 15 receive the nuts 17, by means of which said gland may be forced downwardly into close contact with the packing.

It will be observed from the foregoing description that the gland 7 is incapable of rotary movement and that consequently no twisting action can be imparted to the leather packing-rings 6; also, that the means for imparting longitudinal movement to said gland is independent of the packing altogether. It will also be observed that by the provision of the corrugated or roughened engaging surfaces of the rings 5 and the gland 7 the leather packing-rings 6 are securely retained in position and prevented from either outward or rotary movement.

Having thus described my invention, what I desire to secure by Letters Patent is—

A rod-packing, comprising a plurality of metallic rings, one above the other, having their upper and lower surfaces corrugated and having internal annular recesses merging into the central orifices therein, a seat for said rings, rings of leather, or other like material, interposed one between each pair of said rings, a gland having a corrugated lower end engaging one of said leather rings opposite said seat, and means for imparting a direct longitudinal movement to said gland.

In testimony whereof I have hereunto set my hand in presence of two subscribing witnesses.

JNO. SHEPHERD McDONALD.

Witnesses:
H. P. LAHATUT,
T. J. FORD.